Oct. 7, 1969

J. L. HALSMER 3,470,961

DUAL ENGINE STARTING CLUTCH

Filed Sept. 19, 1967

INVENTOR
JOSEPH L. HALSMER
BY
*Trask, Jenkins & Hasley*
ATTORNEYS

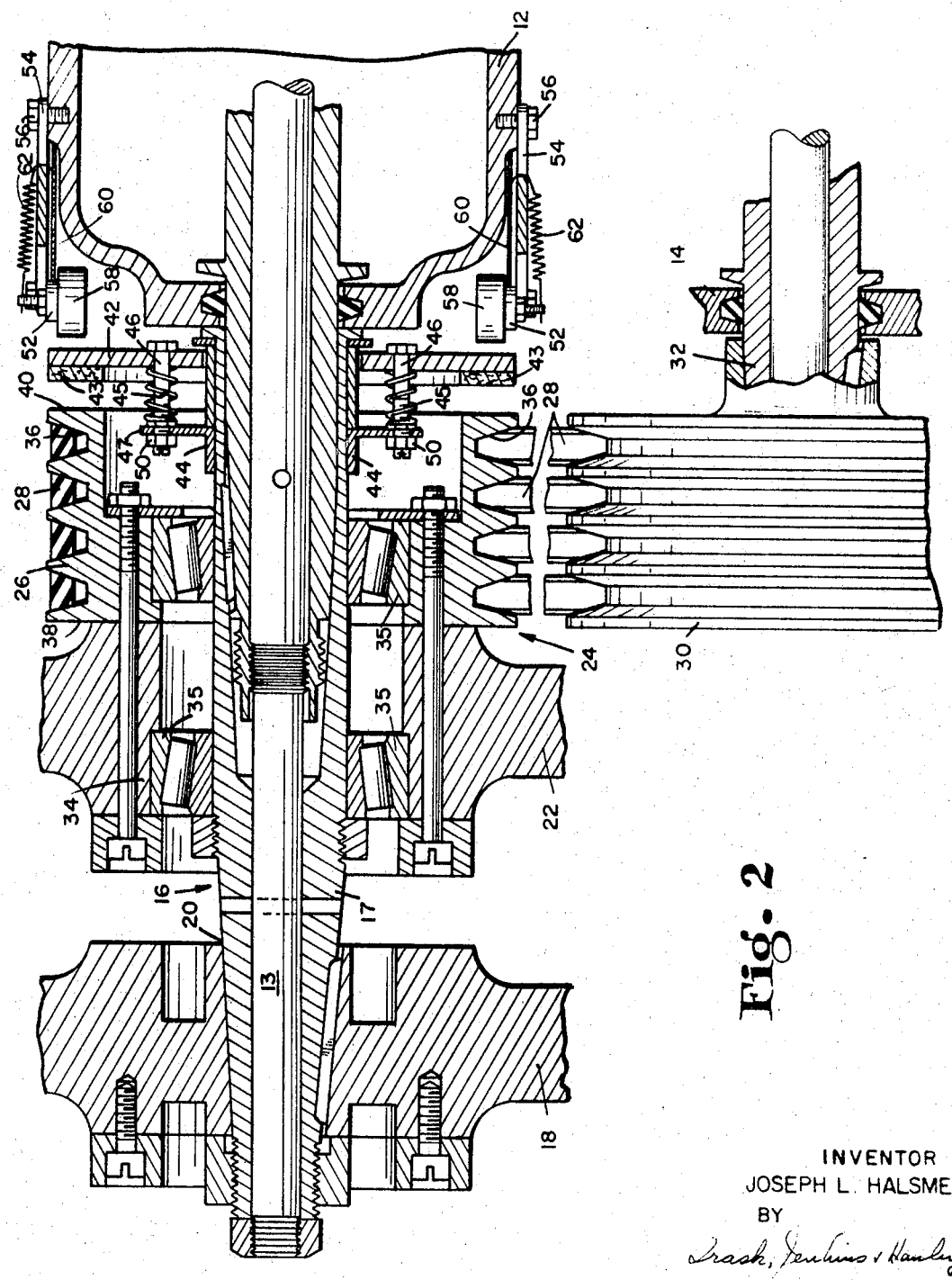

3,470,961
DUAL ENGINE STARTING CLUTCH
Joseph L. Halsmer, Rte. 5, Lafayette, Ind. 47905
Filed Sept. 19, 1967, Ser. No. 668,787
Int. Cl. B64c 27/12; B63h 3/10
U.S. Cl. 170—135.25                              5 Claims

ABSTRACT OF THE DISCLOSURE

A starting clutch for a twin engine aircraft having two propellers mounted coaxially on a single shaft. The forward propeller is fixedly attached to the coaxial shaft which is driven by one of the engines, and the rearward propeller and a pulley are together rotatably mounted on a bearing on that same shaft and driven by belts from a second pulley on the shaft of the second engine. The rear face of the first pulley is provided with a clutch face, and a clutch plate is mounted on the propeller shaft for rotation therewith and is movable to engage the pulley clutch face upon operation of a clutch-engaging lever actuated by linkage from the cockpit. The clutch engagement couples the two engines together so that if either engine is operating, the other may be started by engaging the clutch.

BACKGROUND OF THE INVENTIION

Figure 1:
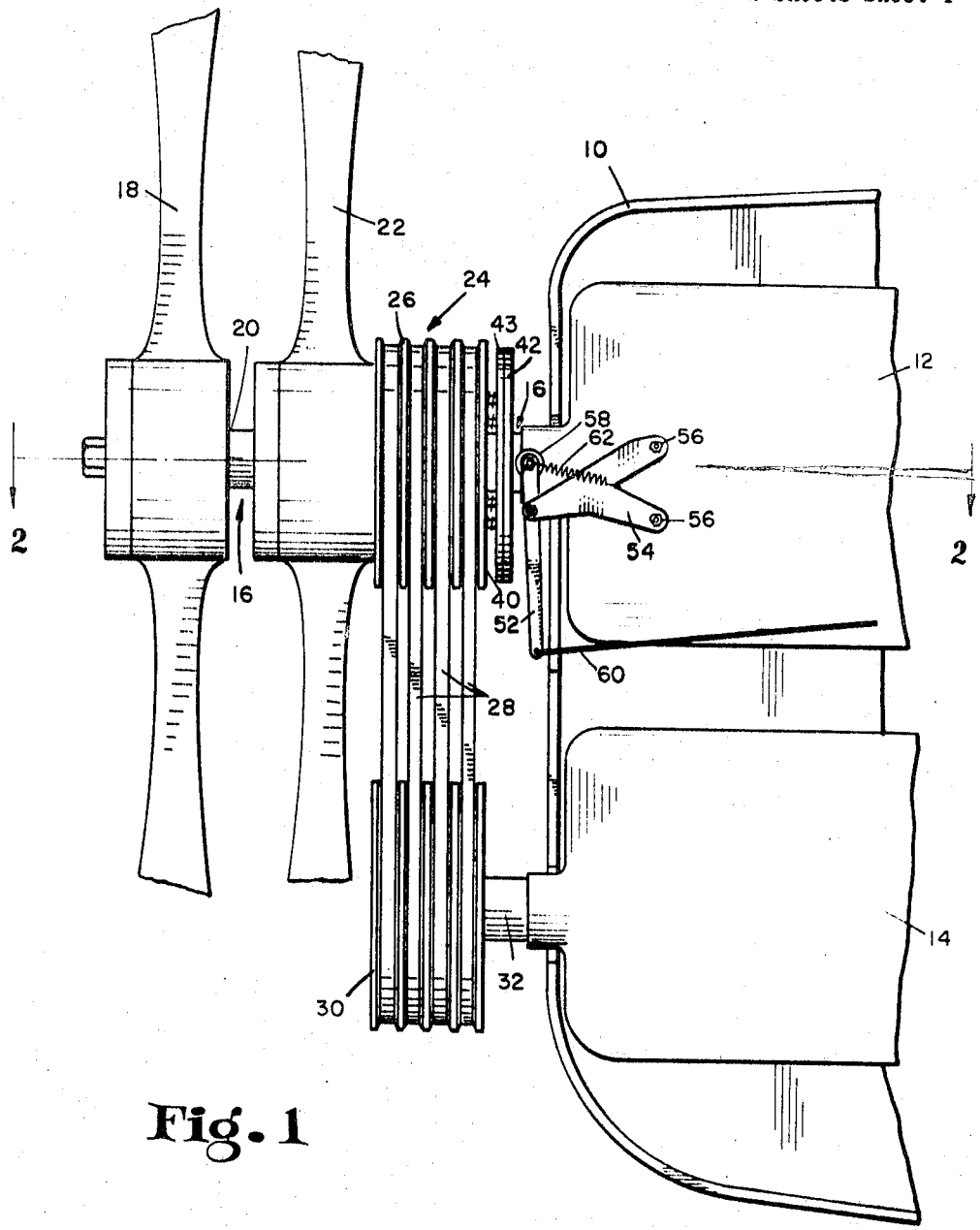

My U.S. Patent No. 2,978,208, issued Apr. 4, 1961, discloses a twin engine power system for an aircraft having two engines closely mounted one above the other and separately driving two coaxial but independently rotatable propellers. Due to such coaxial relation the aircraft will remain in balance under all conditions and even when one engine is not operating. However, twin engines require two starting motors and since space and weight are critical design factors in an aircraft, it is desirable to eliminate as much equipment as is safely practicable. The present invention eliminates the starting motor on one engine, by providing a simple, lightweight starter clutch for coupling the two engines together, by which either engine can be started from the other when such other is running.

SUMMARY OF THE INVENTION

The aircraft drive arrangement to which the invention is especially applicable comprises a pair of coaxial propellers, one fixedly mounted on a coaxial shaft driven by one engine, and the other rotatably mounted with a driven pulley on the same shaft and driven by belts or other transfer drive means from a second pulley on a parallel shaft driven by a second engine. In accordance with the invention, a simple lightweight clutch is provided between the coaxial shaft and the propeller rotatable thereon, which serves to couple the two propellers and their engines together so that either engine can be started from the other. Preferably, the clutch comprises a driven clutch face on the driven pulley, and a driving clutch plate rotatable with the coaxial shaft and engageable with the driven clutch element. The clutch is actuated by linkage from the cockpit.

BRIEF DESCRIPTION OF THE DRAWIINGS

The accompanying drawings illustrate my invention.
In such drawings:
FIG. 1 is a side elevation view of the forward portion of a twin engine aircraft embodying my invention, and
FIG. 2 is a horizontal axial section on the line 2—2 of FIG 1.

In the apparatus shown in the drawing the forward portion of an aircraft fusilage 10 encloses a pair of engines 12 and 14 disposed one above the other. The upper engine 12 drives an output shaft 16 which projects outwardly from the engine and has a first propeller 18 fixedly attached to its forward end 20. A second propeller 22 i mounted, coaxially with the first propeller and the shaf 16, on a hub assembly 24 which is free to rotate about th shaft 16. The hub assembly 24 includes a first pulley 2( which is coupled by a plurality of belts 28 to a secon( pulley 30 mounted on the shaft 32 of the lower engine 14

As shown in FIG. 2, the shaft 16 may comprise an ex tension 17 mounted on the tapered front end of the cranl shaft 13 of the upper engine 12.

The hub assembly 24, as shown in FIG. 2, comprise: a sleeve 34 which carries the propeller 22 and is connectec to the first pulley 26. The pulley 26 contains a plurality o grooves 36 for receiving the belts 28. The forward side 3{ of the pulley 26 is attached to the sleeve 34 and this as sembly is mounted on the outer races 35 of a pair of rolle: bearings mounted on the extension 17 of the shaft 16.

The rear side of the pulley 26 is provided with a clutcl face 40. A clutch plate 42 provides a friction clutch be tween the shaft 16 and the clutch face 40, so that when on( engine is running the other may be started by engaging th( clutch elements 40 and 42. The clutch plate 42 comprise: a disc having frictional facing material 43 thereon, slid ably carried by a collar 44 fixedly mounted on the shaft 16 A set of springs 45 engaged between the plate 42 and ; flange 47 on the collar 44 urge the plate to disengagec position, and such position is limited by bolts 46 extend ing through the plate and collar and through the springs The nuts 50 on the bolts 46 may be adjusted to contro the clearance between the clutch elements in disengagec position. The clutch plate 42 rotates with the shaft 16, anc the clutch face on the pulley 26 rotates with the hub as sembly which is connected by the belts 28 to the engine 14

For engaging the clutch, a pair of lever arms 52 ar( pivotally mounted on brackets 54 fixed as by screws 5( to opposite sides of the top engine 12. The upper ends o the arms 52 carry rollers 58 in position to bear agains the rear face of the clutch plate 42, and such rollers ar( normally held in retracted positions by springs 6: stretched between the lever arms and the brackets 54 The lower ends of the lever arms 52 are connected t( linkage 60, such as Bowden wires, coupled to a contro lever (not shown) in the cockpit. Actuation of the contro lever will pivot the lever arms 52 to move their attachec rollers 58 against the clutch plate 42 and press the clutcl plate into engagement with the clutch face on the pulley 26 to engage the clutch.

Only one of the two engines 12 and 14 is provided witl a starter. Either engine may be so equipped, as desirec to meet space requirements, and I here assume that th( top engine 12 has a conventional starter (not shown' and that the lower engine 14 does not have a starter.

In operation, the upper engine is first started by it starter, in conventional manner. The clutch plate 42 wil then be driven with the shaft 16. Then, with that uppe engine running, the clutch control lever is actuated to til the lever arms 52 and carry the rollers 58 forward t( thrust the clutch face 42 into engagement with the clutcl face 40 on the pulley 26. This will drive the upper pulley 26, and, through the belts 38, will drive the lower pulley and the lower engine 14 to start that engine.

If the lower engine is the one provided with the startin; motor, it will be started first and the clutch used in ; similar manner to start the upper engine.

In the event the starter is inoperative, the upper engin( may be started by manual rotation of the forward propel ler, and the second engine then started from the first.

My invention provides an improvement for twin engin( aircraft whereby one starting motor may be replaced b} a starting clutch which is relatively light in weight an( small in size in comparison with a starting motor.

I claim:
1. In a dual engine power assembly for an aircraft which includes a first engine having a propeller shaft extending therefrom, a second engine mounted beside the first engine, two coaxial propellers independently rotatable in the same direction on the axis of said propeller shaft, the first propeller being carried and driven by said shaft extending from the first engine and the second propeller being mounted behind the first on a hub assembly supported by bearings coaxial with said shaft, for independent rotation coaxially with the first propeller, and transfer drive means from the second engine to said hub assembly, the improvement which comprises a starting clutch for starting one of the engines from the other, said clutch comprising a driven clutch face at the rear of said hub assembly and a normally disengaged driving clutch element mounted on said shaft for rotation therewith and movable into engagement with said face, and means to engage said clutch element with said face to clutch the two engines together.

2. The combination as set forth in claim 1 in which said driven clutch face faces rearward and said driving clutch element is a clutch plate, and said clutch engaging means is mounted in normally disengaged position behind said plate and acts to thrust the same forward into clutching engagement with said driven clutch face.

3. The combination set forth in claim 2 in which said clutch comprises a collar fixed on said shaft adjacent the driven clutch face, a clutch plate mounted on said collar, and spring means acting between the collar and plate to bias the plate rearward to disengaged position.

4. The combination set forth in claim 3 in which the clutch engaging means comprises rollers carried by levers pivoted on fixed supports behind the plate, and means operable from the cockpit of the aircraft for pivoting the levers to carry the rollers into engagement with a rear thrust surface of the clutch plate and thrust the said plate forward into clutching engagement with the driven clutch face.

5. The combination set forth in claim 2 in which the hub assembly comprises a driven pulley and the driven clutch face is formed on such pulley.

References Cited

UNITED STATES PATENTS

| 1,771,654 | 7/1960 | Powell | 170—135.25 |
| 1,793,933 | 2/1931 | Hoffman | 170—135.25 |
| 1,779,644 | 10/1930 | Silver | 170—135.25 |
| 1,867,473 | 7/1932 | Purser | 170—135.75 |
| 2,826,255 | 3/1958 | Peterson | 170—135.75 |
| 3,253,474 | 5/1966 | Ballauer et al. | 170—135.75 X |
| 3,335,979 | 8/1967 | Kurkjian | 170—135.75 X |

FOREIGN PATENTS 509,694   8/1920   France.

EVERETTE A. POWELL, JR., Primary Examiner

U.S. Cl. X.R.

170—135.75